United States Patent [19]
Cadwell

[11] 3,791,817
[45] Feb. 12, 1974

[54] RECOVERY OF COOPER FROM COPPER SULFIDE CONTAINING CONCENTRATES

[75] Inventor: Edward Peter Cadwell, Tucson, Ariz.

[73] Assignee: Treadwell Corporation, New York, N.Y.

[22] Filed: Feb. 10, 1972

[21] Appl. No.: 225,095

[52] U.S. Cl............... 75/106, 75/105, 423/29, 423/47
[51] Int. Cl............................................. C22b 3/00
[58] Field of Search... 75/105, 106, 117; 423/29, 47

[56] References Cited
UNITED STATES PATENTS

| | | | |
|---|---|---|---|
| 1,654,918 | 1/1928 | Buchanan et al. | 75/106 X |
| 3,303,021 | 2/1967 | Roberts | 75/105 |
| 3,321,303 | 5/1967 | Roberts | 75/106 |
| 3,403,020 | 9/1968 | Lower | 75/106 |
| 3,189,435 | 6/1965 | Lower | 75/105 X |
| 3,429,694 | 2/1969 | Lower | 75/105 X |
| 1,810,487 | 6/1931 | Lawr | 423/29 |

Primary Examiner—Herbert T. Carter
Attorney, Agent, or Firm—Robert Ames Norton

[57] ABSTRACT

Low grade copper sulfide containing concentrates and ores are treated with an alkaline cyanide, such as calcium cyanide and excess lime or sodium cyanide and excess sodium alkali. This dissolves the copper sulfide as a complex cyanide, the liquor is separated from the denuded solids, and the solids washed with water to remove adhering soluble copper cyanide complex. The two liquors are then treated with acid or metal salts to desulfurize them, transforming the sulfur content either to hydrogen sulfide or a metal sulfide and precipitating the copper as acid insoluble cuprous cyanide. The cuprous cyanide is separated and copper recovered therefrom by known methods, such as reduction with hot hydrogen. HCN evolved if the desulfurization is by acid and/or from the hydrogen-HCN produced by the hot hydrogen reduction is transformed into alkaline cyanide and reused. A reducing agent, such as sulfur dioxide, is present during the cuprous cyanide precipitation in sufficient amount to maintain copper in the cuprous state.

8 Claims, 1 Drawing Figure

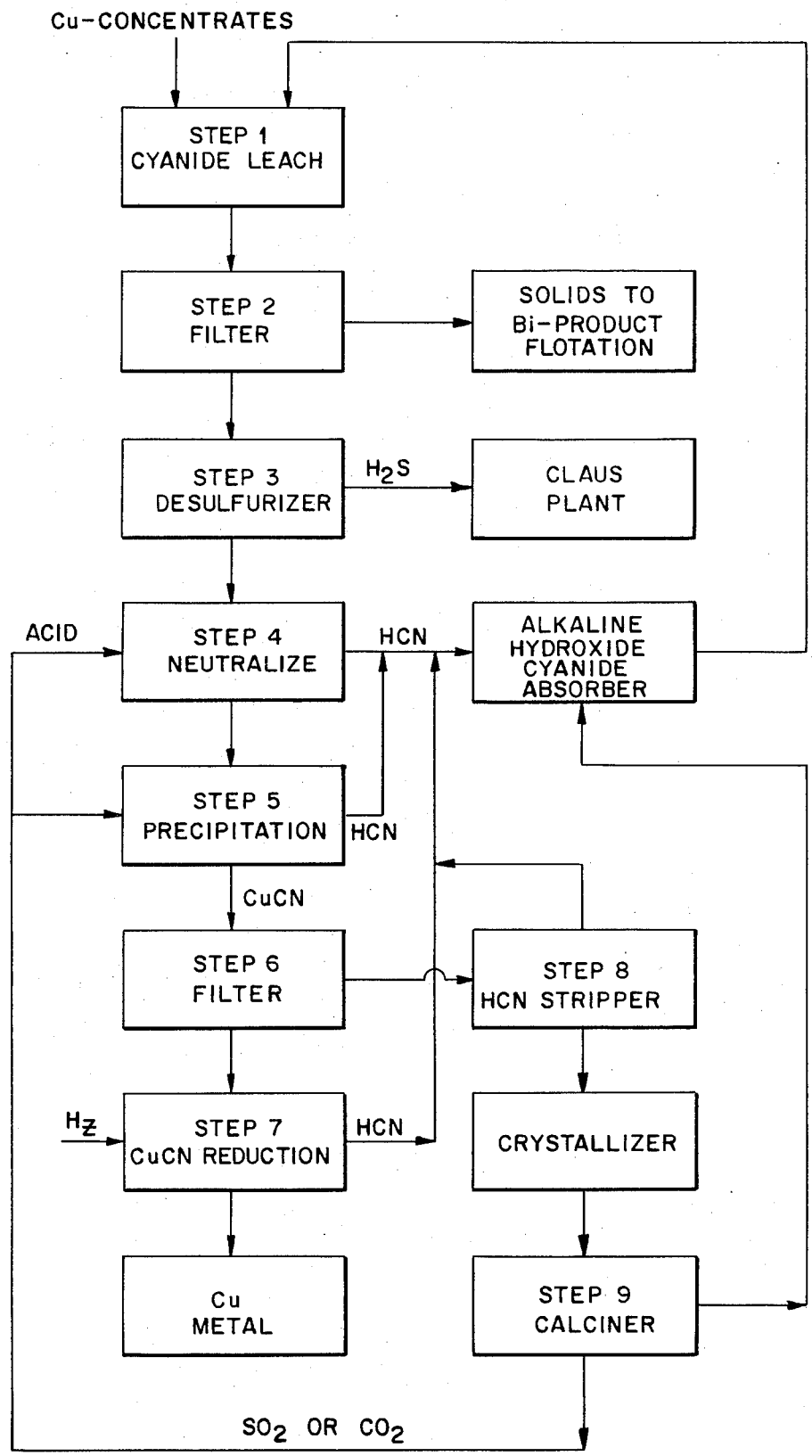

RECOVERY OF COOPER FROM COPPER SULFIDE CONTAINING CONCENTRATES

BACKGROUND OF THE INVENTION

Low grade copper sulfide containing ores and concentrates have been concentrated by flotation and smelted, with or without formation of copper matte. The process, while economical with suitable materials, produces large quantities of sulfur dioxide, which is a serious atmospheric pollutant and if it is to be recovered requires some fairly expensive treatment. The $SO_2$ pollution problem is made much more serious if the concentrate contains iron sulfides, such as pyrite or the iron sulfide compoennt of chalcopyrite. With many concentrates the amount of iron sulfides, which will be referred to in the remainder of this specification generically as "pyrite" though they do not necessarily always exist 100 percent in the form of this particular mineral, is a frequent and large contaminant of the ore or concentrate. In many cases the weight of pyrite may be as much as 90 percent or more of the total sulfide content of the ore or concentrate. It is possible to separate, at least partially, sulfides of copper and iron, for example by selective froth flotation, but this adds substantially to the cost and in the case of many ores, particularly low grade ores or concentrates with large amounts of pyrite, the cost for copper recovery becomes prohibitive or at least unattractively high. Also, when there is a large amount of pyrite present a substantial amount of the copper sulfide may associate itself therewith and copper losses are increased, which makes the recovery even less economically attractive, and in the case of some low grade copper sulfide ores, prohibitive.

In general pollutant legislation and economics have thus made the recovery of copper from certain low grade copper ores economically unfeasible and with some ores relatively expensive.

It is also possible with some very low grade copper ores to leach with sulfuric acid and produce solutions containing cupric sulfate. From such solutions there is now available a very economic process for recovering pure copper. This forms the subject matter of the Roberts U.S. Pat. No. 3,321,303, May 23, 1967. This process will be described more fully below in connection with the improvements of the present invention. At this point, however, it should be pointed out that the production of solutions of cupric sulfate is still subject to substantial drawbacks, both economic and metallurgical. In the first place, acid leaching with ordinary dilute sulfuric acid is only practical with oxidized copper ores, and the recovery of copper leaves much to be desired. Nevertheless, where materials which would otherwise be worthless are concerned, such as tailings piles, it can be a practical method.

It has been proposed to treat copper sulfide ores with an alkaline cyanide leach liquor. This term will be used throughout the present specification in its normal meaning in the art, namely a solution of cyanide with sufficient alkali to keep the pH high enough, usually pH 10 or more, so that the copper is effecitvely dissolved and alkaline sulfides are formed. Examples of alkaline cyanide liquors are the black cyanide obtained from calcium cyanamid and which contains calcium cyanide and a considerable amount of lime, so that the requisite high pH is furnished. This black cyanide is very extensively used for the recovery of precious metals by the cyanidation process, and as it is sold at a lower price on the basis of its sodium cyanide equivalent with no charge for the lime, it makes an attractive reagent. Sodium cyanide has also been used, with suitable alkali to maintain the desired high pH, for certain operations where sodium cyanide is cheaply available or where extremely high transportation costs render the black cyanide with its large lime content unattractive. As will be pointed out below, the present invention uses such an alkaline cyanide solution in one of its process steps, and as it makes no difference whether this is based on calcium cyanide or sodium cyanide, the general term "alkaline cyanide solution" will be used. The fact that alkaline cyanide solutions will dissolve copper from copper-containing ores, such as those containing copper sulfides, has been known for a long time. In fact the compounds are often referred to as "cyanicides," and their presence in precious metal ores is a serious drawback and has rendered some such ores uneconomic for the recovery of precious metals, either because of the large consumption of alkaline cyanide by the copper compounds or because of the cost of reducing the amount of cyanicides by other processes which add to the cost.

The use of alkaline cyanide solutions for the purpose of recovering copper from ores and concentrates containing copper sulfides and where the copper is the principal metal value is known, and such processes are described in the Lower U.S. Pat. No. 3,189,435, June 15, 1965, and the Roberts U.S. Pat. No. 3,303,021, Feb. 7, 1967. Both of these patents encountered the problem that a small but still not insignificant amount of copper is precipitated on acidification as cuprous cyanide, and this was considered as constituting a loss of cyanide, which had rendered the alkaline cyanide solution method of recovering of copper values hitherto uneconomic with most ores and concentrates. The two patents referred to avoid serious losses from precipitated cuprous cyanide by making sure that there is sufficient sulfide ions present when the solution of the copper cyanide complex is broken up or copper precipitated therefrom. Typical compounds used are hydrogen sulfide, sodium sulfide, sodium hydrosulfide, calcium sulfide, and in some cases ammonium sulfide. The copper was largely precipitated as a sulfide, with cuprous cyanide precipitation greatly reduced or substantially eliminated, and so cyanide losses also reduced.

The Lower and Roberts processes above described might be considered really as processes which in the main are concentrating copper sulfide from low grade ores. The problems of recovering copper still remain: The $SO_2$ pollution problem is not solved, and while the high concentration of copper sulfide makes possible some practical recoveries in certain cases, the problem of getting copper from copper sulfide even though greatly concentrated and purified still remains.

SUMMARY OF THE INVENTION

The present invention treats copper sulfide containing ores and concentrates with alkaline cyanide solutions just as was done before. This solution is separated from the solids, which have been partially denuded of copper, just as was done before. However, with low grade ores and hence an enormous amount of gangue including pyrite in many ores, which are among those most effecitvely treated by the present invention, the copper adhering in solution to these large amounts of gangue is a sufficiently large proportion of the total copper content of the ore or concentrate that it cannot be disregarded and still have an economical process for low grade ores.

The next step after separating the copper cyanide complex solution from the denuded solids is to wash these solids with water. This has been done before, but the wash water is so dilute that it could not be used as a source of copper in the Lower and the earilier Roberts patents referred to above. They had to treat it in various ways to get a satisfactory concentration. In the present invention on the contrary, the wash water from the denuded solids is simply mixed with the alkaline cyanide leach liquors because, as will be pointed out below, the present process can recover copper satisfactorily from this overall heavily diluted solution. As a result a very large proportion of the original copper content of the ore or concentrate is recoverable, which makes the alkaline cyanidation treatment step economically feasible as the eventual cyanide loss is very drastically reduced to a point sufficiently small so that the economics of the process are favorable.

At this point a very important feature of the present invention comes into play. Instead of making every effort to prevent or reduce precipitation of copper as cuprous cyanide and to precipitate as much as possible as a copper sulfide, procedures are followed, which will be described in more detail below, which desulfurize the liquor and precipitate practically all or a very large portion of the dissolved copper as cuprous cyanide. The cuprous cyanide, except in the unusual situations where there is a market for this chemical in high purity, can readily be treated by the process of the Roberts U.S. Pat. No. 3,321,203 to obtain very pure copper with a very high recovery of HCN. This last step, of course, is not a new step as such, but when joined to the other steps of the present invention as in one of the aspects of the invention, it recovers copper with excellent recovery at lower cost, without pollution of the atmosphere with $SO_2$ and without significant losses of cyanide. As in many inventions, the present invention involves a combination of steps some of which taken by themselves are not new but are combined in a new way to produce a new and advantageous result. The novelty and patentability of the invention lies in the new combination and the new result.

In the present invention the mixed alkaline cyanide leach liquor and the much more dilute wash liquor from the denuded solids are treated in a process which precipitates cuprous cyanide and not copper sulfide. This step will be referred to below, particularly in conjunction with the drawings, as a desulfurizing step. It may be accomplished in several ways: One way is to treat with acid. The sulfide of the particular alkali, such as calcium or sodium, which is formed when the copper sulfide is leached with the alkaline cyanide solution, is transformed into a form from which $H_2S$ can be stripped at a pH at which CuCN is not precipitated, for example pH of approximately 8. The pH is then lowered to remove HCN. During this operation cuprous cyanide precipitates practically quantitatively. The removal of $H_2S$ before precipitation of CuCN is an essential feature of the present invention. If this is not done the $H_2S$ can react and precipitate at least a part of the copper as a sulfide.

Sulfur content in the above modification of the present invention is transformed into $H_2S$, and the alkali of the alkaline cyanide solution is, of course, transformed into the salt of the acid used. The $H_2S$, of course, cannot be vented to the atmosphere as it is an even more toxic pollutant than $SO_2$. However, it can readily be reacted with $SO_2$, which is either produced in the process of the present invention or readily available, in a conventional Claus plant to form elemental sulfur, which is not a pollutant and which can be shipped long distances economically. Another desulfurizing process is to react the alkaline sulfides produced in the alkaline cyanidation with a metal slat, such as lead salt, which forms the salt of the alkali cation of the sulfide and a sulfide of the metal, for example, lead sulfide. The importance of the step is that the soluble sulfide is transformed into a form in which it is no longer reactively present in the liquor.

Treatment of the copper cyanide complex with acid is preferably effected first by an acid, such as carbonic acid, down to a pH above that at which cuprous cyanide precipitates. The pH is sufficiently low, for example approximating 8, so that $H_2S$ is given off and is removed. Then the pH is lowered to that at which HCN is formed. The HCN can be removed and recovered in an alkaline hydroxide, which is then used to treat more concentrate or ore. The fixing of the HCN, of course, should be preferably with a sufficient excess of alkali so that the resulting solution has the right pH for treatment of the copper sulfide ores and concentrates.

The pH is then maintained at a value at which precipitation of cuprous cyanide occurs, for example the pH may be as low as 5. This portion of the process should preferably be in the substantial absence of oxygen so that the reactive copper compounds are in the cuprous state because it is only cuprous cyanide which is insoluble in the acid medium. The cuprous cyanide produced is separated, for example by filtration, washed, dried, and if desired, briquetted. It can then be used in the last step of the process of the Roberts U.S. Pat. No. 3,321,303 by reacting with hot hydrogen to produce very pure copper and a gas which is a mixture of the excess hydrogen, always used in this portion of the Roberts process, and HCN. These constitutents are separated by known means described in the Roberts patent and the HCN reused as makeup HCN for further amounts of alkaline cyanide leaching medium. The liquor remaining from the filtration in which the cuprous cyanide is recovered can then be steam stripped of any HCN content, evaporated, and crystallized to recover sulfates, sulfites or carbonates of the metals, such as alkaline earth or akali metals, the particular salt of course depending on the acid used or salt used to desulfurize. The crystallized materials can, if desired, be calcined to produce $SO_2$, $CO_2$, an alkali such as lime, and recycled in the process. However, this is not an essential step, and the $SO_2$ or $CO_2$ used may be obtained from any desired source. It will be noted that at no point is there any $SO_2$ discharged into the atmosphere, and the major content of sulfur in the ore or concentrate is discarded in the gangue, for example as pyrite in the preferred ores and concentrates which contain large amounts of pyrite contaminants. Not only is there no pollution, but little or no expensive cyanide is lost. It should be noted that the precipitation of copper as the sulfide in the Lower or first Roberts patent process does not eliminate completely cyanide losses, because as the two patents point out it is not possible to prevent some of the copper precipitating as cuprous cyanide.

Every effort is made by the addition of the sulfide ion to reduce as far as possible any cuprous cyanide precipitate. As the patents point out, this is not a complete elimination, and this is one of the reasons that the Lower and first Roberts patent processes have not been economically attractive for many low grade copper sulfide containing ores and concentrates. In the present process, by eliminating the precipitation of copper sulfides and, on the contrary, precipitating practically all of it as cuprous cyanide, it is possible to recover the vast majority of the cyanide and a much cheaper and pollution-free process results. The process of the present invention, which does not minimize precipitation of cuprous cyanide as do the Lower and first Roberts process but, on the contrary, maximizes it to an almost quantitative point, produces important advantages. It is not described or suggested in the Lower and first Roberts patents that by removing or avoiding the copper sulfide precipitation, which is the essence of their processes, a more economical process results and particularly, surprisingly, cyanide losses are reduced to an insignificantly small amount. As has been pointed out, after separating the alkaline cyanide leach liquor by filtration and washing of the denuded solids, the presence of the sulfide ion is defeated. This step will be referred to as "desulfurization" regardless of whether the sulfide ion is physically removed as hydrogen sulfide or is transformed into a form in which it no longer reacts with cuprous cyanide.

BRIEF DESCRIPTION OF THE DRAWINGS

The drawing is a flow sheet of numbered steps of a complete process which ends up as metallic copper and which recovers $SO_2$ and $CO_2$ depending on the variant used. It will be noted that essentially the only reagent which is consumed without more or less complete recycle is hydrogen. It should be noted that in the process of the second Roberts patent hydrogen is used in excess and this excess is recycled.

While the flow sheet of the drawing with its nine steps sets forth the complete process using the variant of acid desulfurization, actually steps 6, 7, 8 and 9 are not new per se, or at least 7, 8 and 9, because the Roberts process in these steps is not changed. Once cuprous cyanide is precipitated in step 5 and separated in step 6, it may be used for any purpose desired, and one might consider that, at least as a sub-combination, the present invention stops with step 5. However, if it is desired to recover metallic copper from the ore, step 7 makes this possible without any cyanide loss. If the cuprous cyanide is used for some other purpose, of course the large saving in HCN is not achieved and much more makeup HCN is needed. However, where pure cuprous cyanide has a worthwhile market, as is the case in a few places in the world, it sells for more than the cost of the cyanide and the other steps used in producing it.

From the standpoint of producing metallic copper, while step 7 by itself is an old step in the second Roberts patent, it is one of the things that makes the present invention a greatly improved method of recovering copper because without this step the HCN consumed when copper is precipitated as cuprous cyanide is not eliminated, the object which the Lower and first Roberts patents so desperately tried to accomplish. Therefore, the overall process represented on the drawing, at least through step 7, is also a part of the invention and included therein. In such a case the new desulfurizing step 3, which permits effectively using the very dilute wash water from the denuded solids, is combined with two old steps, that is the preliminary leaching with alkaline cyanide solution and the final transformation of the cuprous cyanide into metallic copper.

DESCRIPTION OF THE PREFERRED EMBODIMENTS

The invention will be described in greater detail in conjunction with the following examples, which are illustrative only and in which the parts are by weight.

EXAMPLE 1

A froth flotation concentrate of a low grade copper ore containing 0.85 percent copper, the concentrate also containing large amounts of pyrite, accounting for substantially 97 percent of the total sulfur content is used as a raw material. A 300 gram sample of the rougher concentrate assaying 13.46% Cu and containing 40.38 grams thereof was leached with 925 cc. of an alkaline leach liquor. After one-half hour agitation the slurry was filtered and the solids washed to remove adhering leach liquor therefrom. The two liquids were mixed. In addition to the copper present as cuprous sulfide, there was a small amount of minerals which formed cyanide insoluble products. These included some molybdenum disulfide and a small amount of chalcopyrite.

The leach liquor contained 38.77 grams of dissolved copper as the cyanide complex and 1.63 grams was present in the solids as cyanide insoluble minerals. These minerals were recovered from the denuded solids by froth flotation, first with a molybdenite promoter to form a molybdenite concentrate and then with a promoter which floats chalcopyrite. This recovery from the solids is not an essential part of the present invention but is described merely to bring out that even the small amount of copper not dissolved, less than 4 percent, need not be wasted. Even if the solids were discarded, the copper recovery is better than 96 percent.

The leach liquor, at a pH of about 10, was treated with carbon dioxide to lower the pH to 8, thus expelling the $H_2S$ from the solution. Addition of $CO_2$ was continued to reduce the pH to about 7, during which time HCN was evolved and fixed with alkali to form a part of the recylced alkaline cyanide leach solution.

The leach liquor was then acidified with $SO_2$ down to a pH of about 4. During this time cuprous cyanide was precipitated. The amount of $SO_2$ was approximately equivalent to twice the stoichiometric quantity. The cuprous cyanide precipitate was filtered from the slurry and dried. The recovery of copper from the leach solution was practically quantitative. The precipitate assayed 70.33% Cu, which indicates pure cuprous cyanide. Only a faint trace of copper could be found in the filtrate. The filtrate, however, contained some HCN, which was stripped by steam and recycled as shown on the flow sheet in the drawing.

It will be noted that the overall recovery of copper from the rougher concentrate was very high, as pointed out above, even neglecting a chalcopyrite concentrate from the solids. No $SO_2$ was discharged to the atmosphere. The major portion of the sulfur was discharged in the denuded product as pyrite and the remaining sulfur content was recovered in the Claus plant as indicated on the drawing.

The following table shows the metallurgical results with respect to copper:

TABLE 1

| Product | Wt. Gr. | Assay % Cu | content Gr. C. | Distribution Cu. |
|---------|---------|------------|----------------|------------------|
| Feed | 300.0 | 13.46 | 40.38 | 100.0 |
| Solution | 2400 cc. | 16.14 gpl | 38.75 | 96.01 |
| Residue | 243.4 | 0.67 | 1.63 | 3.99 |
| No. 1 Con | 6.4 | 1.11 | 0.07 | 0.17 |
| No. 2 Con | 8.5 | 14.34 | 1.22 | 2.98 |
| Tail | 228.5 | 0.15 | 0.34 | 0.84 |
| Filtrate | 3000 cc. | 0.07 gpl | 0.21 | 0.5 |
| CuCN | 54.74 | 70.4 | 38.54 | 95.44 |

EXAMPLE 2

| Product | Wt. Gr. | % Wt. | % Cu | Assays % Zn | % Mo | Content, Gr. Cu | Mo | Distribution Cu | Mo |
|---------|---------|-------|------|-------------|------|-----------------|-----|-----------------|-----|
| Feed | 1037.0 | 100.0 | 12.62 | | | 130.79 | 2.24 | 100.0 | 100.0 |
| Solution | 2.2 l. | | 54.14 | | | 119.02 | | 91.00 | |
| Residue | 789.9 | 76.2 | 1.49 | | | 11.77 | | 9.00 | |
| Mo Con | 3.1 | 0.3 | 0.64 | 0.09 | 36.69 | 0.02 | 1.13 | 0.02 | 50.4 |
| Mo Tail | 35.4 | 3.4 | 1.76 | 0.20 | 0.708 | 0.62 | 0.27 | 0.47 | 12.1 |
| Cu Con | 39.3 | 3.8 | 13.22 | 0.54 | 0.882 | 5.19 | 0.34 | 3.96 | 15.2 |
| Cu Tail | 712.1 | 68.7 | 0.82 | 0.11 | 0.07 | 5.94 | 0.50 | 4.54 | 22.3 |

EXAMPLE 2

A rougher concentrate was produced from an ore assaying 60% Cu as cuprous sulfide. There was a major content of pyrite, amounting to approximately 90 percent of the total sulfur content of the ore, together with some molybdenite.

1037.0 grams of the rougher copper sulfide concentrate assaying 12.62% Cu and containing 130.79 gr. of copper was used. This was leached with an alkaline cyanide solution solubilizing 119.02 gr. of copper. As in Example 1 and as shown in the drawing, the slurry was filtered, the denuded solids were washed, the two solutions mixed, and the washed, denuded solids were then subjected to froth flotation to produce a molybdenum concentrate which contained 0.49 percent of the copper and a copper concentrate of cyanide insoluble copper minerals containing 3.96 percent of the total copper. The tailing, pyrite, was rejected and contained 4.54 percent of the total copper.

The leach liquor and wash was neutralized with $CO_2$ to a pH of 8 and the $H_2S$ produced transformed into elemental sulfur by the conventional Claus process.

As in Example 1 the treatment with $CO_2$ was continued down to a pH of about 7 and the HCN evolved trapped in alkali for recycling. Treatment with $SO_2$, as in the Example 1, was then started and continued to pH 4, using substantially the same amount of $SO_2$.

As in Example 1 the cuprous cyanide was precipitated, filtered, dried, and assayed pure CuCn with only a faint trace of copper in the filtrate. The filtrate was stripped of HCN as described in Example 1. The following table shows the metallurgical results with respect to copper and molybdenum. The assay also shows that the ore contained a very small amount of zinc.

It will be noted that approximately 90 percent of the total sulfur content of the concentrate was rejected as pyrite and nearly all of the remaining 10 percent was transformed into elemental sulfur by the Claus process. No pollution of the atmosphere took place.

EXAMPLE 3

An ore assaying 0.85 percent copper as sulfide was subjected to froth flotation, reground and cleaned, recovering approximately 80 percent of the copper in the ore.

Nine hundred gr. of the final copper concentrate assaying 25.72% Cu and containing 231.48 gr. copper was leached with an alkaline cyanide solution of calcium cyanide and lime for 30 minutes and then filtered. Sufficient of the cyanide solution was used to solubilize about 90 percent of the copper in the sulfide, 206.27 grams of copper being solubilized. The residue contained 10.9 percent of the copper as cyanide insoluble concentrates, but when subjected to froth flotation as described in conjunction with Examples 1 and 2, the denuded solids contained about 90 percent of the total sulfur content of the ore as pyrite. The concentrate also contained substantial amounts of molybdenum disulfide, which, as in the other examples, was recovered by froth flotation of the denuded solids. The assays with respect to copper and molybdenum are shown in the following table:

EXAMPLE 3

| Product | Wt. Gr. | % Wt. | % Cu | Assays % Mo | Content, Gr. Cu | Mo | Distribution Cu | Mo |
|---------|---------|-------|------|-------------|-----------------|-----|-----------------|-----|
| Feed | 900.0 | | 25.72 | 0.113 | 231.48 | 1.017 | 100.0 | 100.0 |
| Solution | | | | | 206.27 | | 89.10 | 17.4 |
| Residue | 623.9 | 69.3 | 4.04 | | 25.21 | 0.85 | 10.90 | 83.6 |
| Mo Con | 13.6 | 1.5 | 17.14 | 4.9 | 2.33 | 0.66 | 1.0 | 64.9 |
| Cu Con | 81.8 | 9.1 | 26.61 | 0.11 | 21.77 | 0.09 | 9.4 | 9.0 |
| Tail | 528.5 | 58.7 | 0.21 | 0.019 | 1.11 | 0.10 | 0.4 | 9.8 |

EXAMPLE 4

Cuprous cyanide from the preceding three examples was treated with a stream of hydrogen passed over it at a temperature of 300°C. The temperature was maintained for one hour and an excess of over 500 percent of the stoichiometrical amount of hydrogen required was used. A stream containing 95 percent of the HCN was present and the copper of extremely high purity represented essentially a quantitative yield from the cuprous cyanide used. The HCN and the excess hydrogen were then separated by conventional means and the HCN recycled to an alkaline solution and the hydrogen recycled with makeup hydrogen to reduce further amounts of cuprous cyanide to metallic copper.

EXAMPLE 5

Five hundred cc. of the solution produced in Example 1 and shown in Table 1 contained approximately 8 grams of copper and about 2 grams of sulfur as sodium sulfide. To this solution lead oxide was added in quantity sufficient to complex with the sulfide and precipitate lead sulfide. This required about 14.8 grams of PbO and represented a small excess over the stoichiometrical amount. At the termination of the treatment with lead oxide there was no sulfide in solution and the precipitate of lead sulfide was removed by filtration. The pH was then adjusted to precipitate cuprous cyanide as described in Example 1.

EXAMPLE 6

The procedure of Example 5 was repeated replacing the lead oxide with 4.9 grams of ZnO, which also represented a small excess over the stoichiometrical. Zinc sulfide was produced, precipitated, and removed by filtration. As in Example 5 no trace of sulfide sulfur remained in the solution.

I claim:

1. In a process of recovering pure copper from copper sulfide-containing concentrates and ores which comprises in combination the following steps,
    a. leaching the material with an alkaline cyanide leaching medium in amounts sufficient to solubilize all of the reactive copper sulfide,
    b. separating the leach liquid from the solids,
    c. washing copper-containing solution from the solids and mixing it with the leach liquid,
    d. desulfurizing the leach and wash liquids by either treating with acid to a pH at which $H_2S$ is set free but above that at which substantial precipitation of copper sulfide takes place, or treating with a metal salt other than a copper salt capable of reacting with the sulfide content of the leach liquid,
    e. removing the sulfide sulfur compounds formed, and
    f. lowering the pH to the point where cuprous cyanide precipitation is substantially complete, and separating the cuprous cyanide from the liquid.

2. A process according to claim 1 in which the cuprous cyanide is filtered off and is subjected to reduction to metallic copper by means of an excess of hydrogen at temperatures between 190°C. and 600°C., whereby the cuprous cyanide is transformed into metallic copper and a mixture of excess hydrogen and HCN produced, and separating the hydrogen from the HCN and forming alkaline cyanide leach medium from the HCN and recycling it to leach more ore and recycling the hydrogen separated from the HCN after heating to reduce further cuprous cyanide.

3. A process according to claim 1 in which the desulfurization is effected by acid in two steps, maintaining the pH in the first step sufficiently low to set free hydrogen sulfide, removing the hydrogen sulfide, followed by lowering the pH to the point at which cuprous cyanide precipitates and HCN is evolved.

4. A process according to claim 3 in which the $H_2S$ is set free by $CO_2$ and the addition continued to about pH 8 and the $H_2S$ is removed by stripping from the liquid.

5. A process according to claim 4 in which the cuprous cyanide precipitation is effected by the addition of sulfurous acid.

6. A process according to claim 3 in which the hydrogen sulfide is reacted with $SO_2$ by the Claus process to produce elemental sulfur.

7. A process according to claim 4 in which the hydrogen sulfide is reacted with $SO_2$ by the Claus process to produce elemental sulfur.

8. A process according to claim 5 in which the hydrogen sulfide is reacted with $SO_2$ by the Claus process to produce elemental sulfur.

* * * * *